R. L. MOOCK.
PISTON.
APPLICATION FILED JAN. 6, 1919.

1,335,179.

Patented Mar. 30, 1920.

INVENTOR
Roy L. Moock.

ATTORNEYS

UNITED STATES PATENT OFFICE.

ROY L. MOOCK, OF MASSILLON, OHIO.

PISTON.

1,335,179.

Specification of Letters Patent. Patented Mar. 30, 1920.

Application filed January 6, 1919. Serial No. 269,816.

*To all whom it may concern:*

Be it known that I, ROY L. MOOCK, a citizen of the United States, residing at Massillon, in the county of Stark and State of Ohio, have invented a new and useful Piston, of which the following is a specification.

This invention relates to pistons for internal combustion engines and has more especial reference to means for preventing the creeping of lubricating oil above the lower piston ring and around the piston into the combustion chamber. Considerable difficulty is caused in internal combustion engines by lubricating oil passing into the combustion chamber forming a carbon deposit upon the interior of the cylinder and fouling the spark plugs when the oil is subjected to the extreme heat of the combustion chamber.

One object of the invention is the provision of means that will prevent an excess of the lubricating oil from passing beyond the lower piston ring, thus reducing carbonizing of the interior of the cylinder and spark plug to a minimum.

A further object is the provision of a piston in which there is formed upon the outer wall of the piston a groove which communicates with the interior of the piston to allow the oil to be returned to the crank case during the reciprocation of the piston.

A still further object is the provision of a piston in which there is formed upon the outer wall, below the lower piston ring, a series of inclined grooves connecting with an annular groove which communicates with the interior of the piston.

With these objects in view the invention consists in the novel construction and arrangement of parts, hereinafter described, illustrated in the accompanying drawings, and particularly pointed out in the appended claims, it being understood that various changes in the form, proportions, size and minor details of construction may be made within the scope of the appended claims, without departing from the spirit or sacrificing any of the advantages of the invention.

In the drawings.

Similar numerals of reference indicate corresponding parts throughout the several figures of the drawings.

Figure 1:
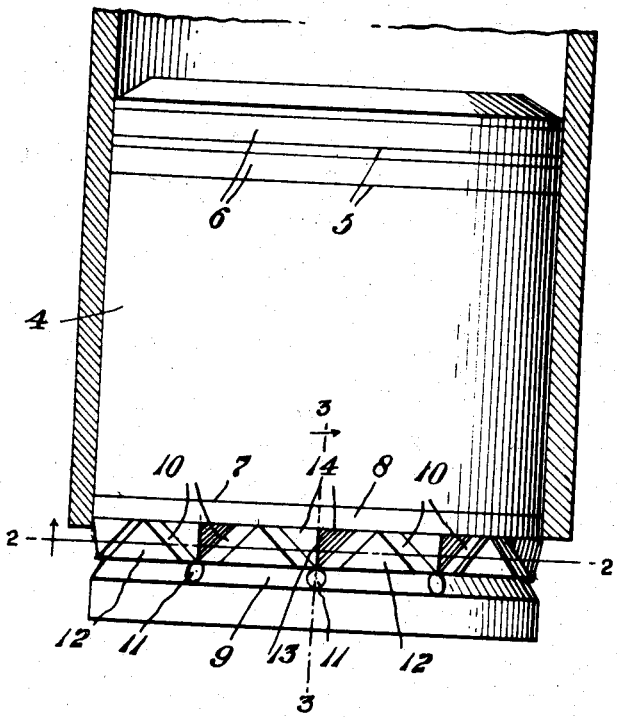
Figure 1 is an elevation of a piston formed in accordance with my invention, a portion of the cylinder being shown in section.
Figure 2:
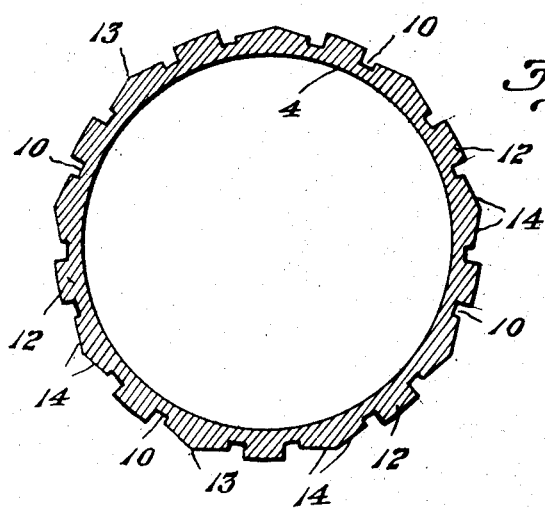
Fig. 2 is a transverse section through the piston on the line 2—2, Fig. 1.
Figure 3:
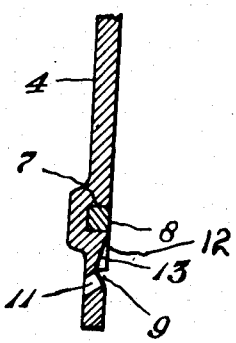
Fig. 3 is a section taken on the line 3—3, Fig. 1.

Referring to the drawings, the numeral 4 designates the complete piston, provided with the upper ring grooves 5, within which are located the rings 6, and with the lower ring groove 7 in which is located the ring 8. Spaced from the lower ring groove 7 and at a suitable point beneath the same, an annular V-shaped groove 9 is formed in the outer wall of the piston and is connected to the ring groove 7 by means of a plurality of inclined grooves 10, these latter grooves being preferably formed in pairs, each pair converging at a point in the V-shaped groove 9, adjacent one of the drain apertures 11, said drain apertures being formed through the piston to the interior thereof and arranged to carry oil from the V-shaped groove 9 to the interior of the piston.

By this construction triangular blocks 12 are formed between each pair of inclined grooves 10. An inverted triangular portion 13 is also formed between each two converging grooves 10, the sides of said triangular portion being beveled as shown at 14, thus forming what might be termed a funnel to assist in conveying the oil to the V-shaped grooves 9 and the drain apertures 11.

With this arrangement lubricating oil is permitted to enter the inclined grooves 10 and is carried through them to the V-shaped groove 9, and the pressure of the piston upon the compression or exhaust stroke forces the lubricating oil through the drain apertures of the piston allowing the oil to drain back into the crank case and preventing it from passing up into the combustion chamber.

I claim:

1. A piston provided with inclined grooves located beneath the lower piston ring and arranged to receive the surplus lubricating oil and an annular groove communicating with said inclined grooves, said annular groove provided with drain apertures.

2. A piston provided with inclined grooves located beneath the lower piston ring and a V-shaped annular groove communicating with said inclined grooves and provided with drain apertures communicating with the interior of the piston.

3. A piston having a ring recess and an annular groove located beneath and spaced from said ring recess, inclined grooves connecting said ring recess and annular groove, said annular groove provided with drain apertures communicating with the interior of the piston.

4. A piston provided with a pair of inclined grooves converging at their lower extremities and with a drain aperture located through the piston at the point where said grooves converge.

5. A piston provided with an annular groove having a plurality of drain apertures connecting said groove with the interior of the piston and a plurality of inclined grooves communicating with said annular groove at points adjacent said drain apertures.

6. A piston provided with an annular groove having a plurality of drain apertures and a plurality of inclined grooves located in pairs and communicating with said annular groove at points adjacent said drain apertures, the upper edges of said inclined grooves being beveled to guide lubricating oil to said grooves.

In testimony that I claim the above, I have hereunto subscribed my name.

ROY L. MOOCK.